United States Patent
Lai et al.

(10) Patent No.: US 6,854,900 B2
(45) Date of Patent: Feb. 15, 2005

(54) METHOD OF FABRICATING A WAVELENGTH DIVISION MULTIPLEXED (WDM) UNIT

(75) Inventors: I-Jen Lai, Taichung (TW); Pie-Yau Chien, Taichung (TW); Chin-Hsiang Wang, T.E.P.E. (TW); Yu-Ting Lee, T.E.P.E. (TW); Tsung-Yueh Tsai, T.E.P.E. (TW); Chih-Hsien Lin, T.E.P.E. (TW)

(73) Assignee: Asia Optical Co., Inc., T.E.P.E. (TW)

( * ) Notice: Subject to any disclaimer, the term of this patent is extended or adjusted under 35 U.S.C. 154(b) by 275 days.

(21) Appl. No.: 10/195,497

(22) Filed: Jul. 16, 2002

(65) Prior Publication Data

US 2003/0185507 A1 Oct. 2, 2003

(30) Foreign Application Priority Data

Mar. 28, 2002 (TW) ....................................... 91106105 A

(51) Int. Cl.$^7$ .............................. G02B 6/36; H04J 14/02
(52) U.S. Cl. .............................. 385/80; 385/31; 385/33; 385/34; 385/52; 385/24; 385/73; 385/74; 398/82; 398/85; 398/88
(58) Field of Search .............................. 385/31, 33, 34, 385/24, 78, 52, 80, 70, 60; 398/82, 85, 88

(56) References Cited

U.S. PATENT DOCUMENTS

| 6,185,347 B1 | | 2/2001 | Zheng | 385/34 |
| 6,246,813 B1 | * | 6/2001 | Zheng | 385/34 |
| 6,282,339 B1 | * | 8/2001 | Zheng | 385/34 |
| 6,433,924 B1 | * | 8/2002 | Sommer | 359/337.1 |
| 6,454,465 B1 | * | 9/2002 | Uschitsky et al. | 385/79 |
| 6,535,668 B2 | * | 3/2003 | Liu et al. | 385/33 |
| 6,582,135 B2 | * | 6/2003 | Brun et al. | 385/78 |

* cited by examiner

*Primary Examiner*—Brian M. Healy
(74) *Attorney, Agent, or Firm*—Rabin & Berdo, P.C.

(57) ABSTRACT

A method of fabricating a WDM unit consists of attaching a first and a second GRIN lenses to opposite faces of a WDM filter. A dual fiber pigtail and a single fiber pigtail are mounted in corresponding glass tubes. The glass tube with the dual fiber pigtail and the glass tube with the single fiber pigtail are mounted on the second GRIN lens and the first GRIN lens respectively. The position of the dual fiber pigtail and the single fiber pigtail are adjusted with respect to the second GRIN lens and the first GRIN lens respectively to obtain the best optical property. The invention prevents the WDM filter from tilting during temperature variation by sandwiching the WDM filter in between the two GRIN lenses, and further prevents the WDM unit from increasing the reflection loss and insertion loss.

12 Claims, 9 Drawing Sheets

METHOD OF FABRICATING A WAVELENGTH DIVISION MULTIPLEXED (WDM) UNIT

BACKGROUND OF THE INVENTION

1. Field of the Invention

The present invention relates to a method of fabricating a wavelength division multiplexed (WDM) unit, and more particularly to a method of fabricating a WDM unit with less reflection loss and insertion loss.

2. Description of Related Art

With reference to FIG. 12, a conventional method of producing a WDM unit is disclosed in U.S. Pat. No. 6,185,347.

According to the conventional method, a dual fiber pigtail (135) is inserted into a second holding tube (glass tube 130) to construct a first optical collimator with a WDM filter (105) by applying a heat curing epoxy (115) between the dual fiber pigtail (135) and heat curing epoxy (115). A single fiber pigtail (175) is inserted into a third holding tube (glass tube 165) to construct a second optical collimator. Lastly, the two optical collimators are aligned and sealed together. However, the procedures for adjusting and aligning the first and second optical collimators are time-consuming and troublesome.

Additionally, the WDM filter (105) attached to the first optical collimator is easily tilted, because the heat curing epoxy (115) for sticking the WDM filter (105) on the GRIN lens (110) shrinks/expands during temperature variations. The tilted WDM filter (105) causes the WDM unit to raise the reflection loss and insertion loss.

In order to obviate and/or alleviate the problem of the conventional method for producing a WDM unit, the present invention provides an improved method for fabricating a WDM unit having accurate alignment with timesaving procedures.

SUMMARY OF THE INVENTION

The main objective of the invention is to provide a method for fabricating a WDM unit, which is streamlined to produce the WDM unit precisely and easily to reduce production cost.

One feature of the invention is that the WDM filter is sandwiched in between two collimators. Thus, the WDM filter is hardly tilted and shifted during temperature variation. Further, the invention has an advantage of preventing the WDM unit from generating reflection loss and insertion loss.

Another feature of the invention is that the WDM unit is packaged by two inner metal tubes and an outer metal tube, wherein the two inner metal tubes respectively hold the two optical collimators, and the WDM filter sandwiched between two collimators is enclosed by the outer metal tube.

Other advantages and novel features of the invention will become more apparent from the following detailed description when taken in conjunction with the accompanying drawings.

DETAILED DESCRIPTION OF THE INVENTION

Figure 1:
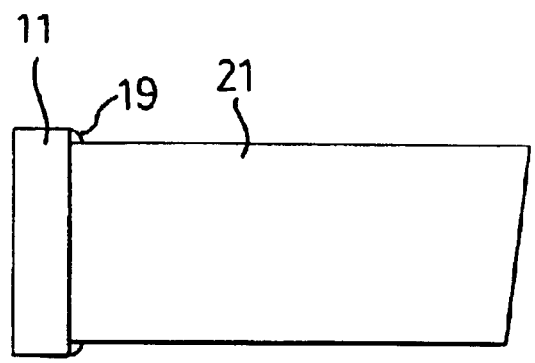
FIG. 1 is a cross-section of partial elements of a WDM unit showing step (a) of a method in accordance with the present invention.

With reference to FIGS. 1 to 9, a method of fabricating a wavelength division multiplexed (WDM) unit in accordance with the present invention includes the following steps:

(a) Attaching a first graded refractive index (GRIN) lens (21) to one side of a WDM filter (11);

(b) Attaching a second GRIN lens (26) to the other side of the WDM filter (11);

(c) Securing two glass tubes (33, 38) inside two inner metal tubes (31, 36) respectively;

(d) Securing a dual fiber pigtail (46) and a single fiber pigtail (41) inside the respective glass tubes (33, 36);

(e) Connecting testing instrument;

(f) Obtaining an optimal alignment by adjusting the dual fiber pigtail (46) with the second GRIN lens (26) and then fixing the second GRIN lens (26) inside the glass tube (38) to form a first optical collimator;

(g) Obtaining an optimal alignment by adjusting the single fiber pigtail (41) with the first GRIN lens (21) and then fixing the first GRIN lens (21) inside the glass tube (33) to form a second optical collimator; and (h) Securing the combination of the first optical collimator and the second optical collimator inside an outer metal tube (39).

With reference to FIG. 1, the step of attaching a first GRIN lens (21) to a WDM filter (11) based on the first GRIN lens (21) is accomplished with glue (19). The first GRIN lens (21) has a flat end, and the WDM filter (11) has two flat faces. One flat face of the WDM filter (11) abuts the flat end of the first GRIN lens (21) by glue (19) to form a junction between the WDM filter (11) and the first GRIN lens (21). Because the area of flat face of the WDM filter (11) is larger than the area of the flat end of the first GRIN lens (21), a circular edge periphery (not numbered) of the flat face of the WDM filter (11) is uncovered when the WDM filter (11) contacts the first GRIN lens (21). The uncovered circular edge periphery and proximal side wall of the first GRIN lens

(21) compose an outer joint periphery, that is, the junction having an outer joint periphery corresponding to an outer edge of the first GRIN lens (21) adjacent to the WDM filter (11). A fillet of glue (19) is applied to the outer joint periphery of the junction between the WDM filter (11) and the first GRIN lens (21) to prevent the glue (19) from obstructing light passing through the WDM unit and then combine the WDM filter (11) and the first GRIN lens (21) together.

Figure 2:
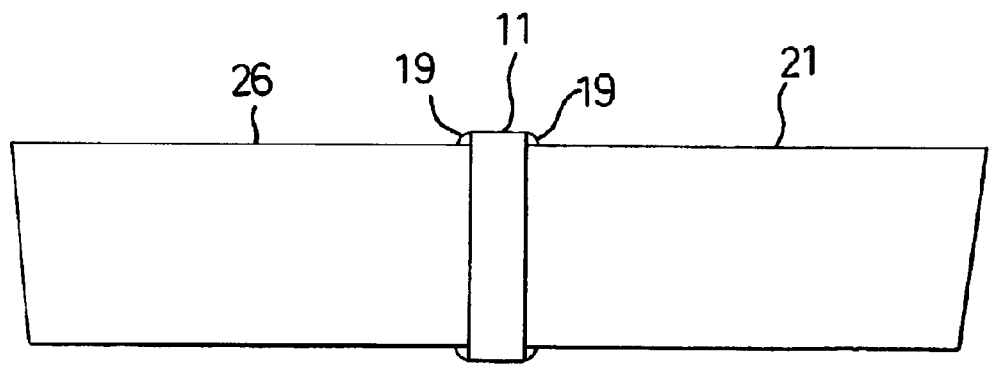
FIG. 2 is a cross-section of partial elements of a WDM unit showing step (b) of the method in accordance with the present invention.

With reference to FIG. 2, the step of attaching a second GRIN lens (26) to the other face of the WDM filter (11) is also accomplished with glue (19). Another fillet of glue (19) is applied to the outer joint periphery of the junction between the WDM filter (11) and the second GRIN lens (26) to prevent the glue (19) from obstructing light passing through the WDM unit. As shown in FIG. 2, the WDM filter (11) is sandwiched between the first and second GRIN lenses (21, 26).

Figure 3:
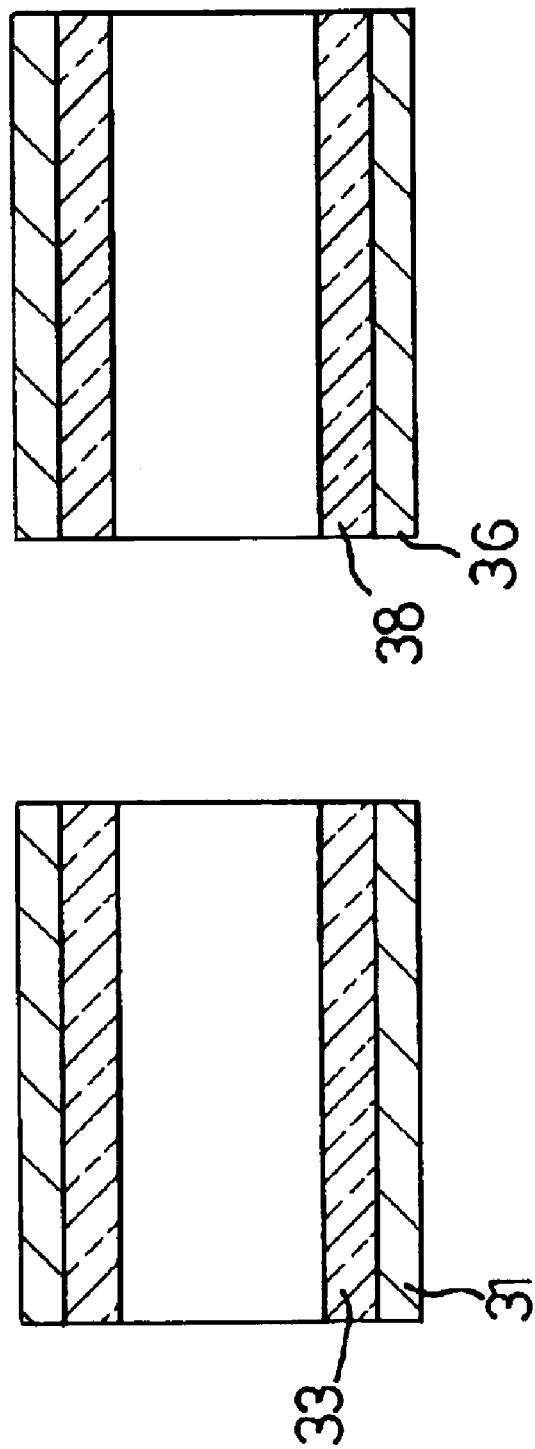
FIG. 3 is a cross-section of partial elements of a WDM unit showing step (c) of the method in accordance with the present invention.

With respect to FIG. 3, the step of securing two glass tubes (33, 38) in two inner metal tubes (31, 36) respectively is accomplished with glue. In the embodiment, the glue (not shown) is spread on outer sidewalls of the two glass tubes (33, 38) and/or inner sidewalls of the two inner metal tubes (31, 36). Next, the two glass tubes (33, 38) are respectively inserted into the two inner metal tubes (31, 36) and fixed therein.

Figure 4:
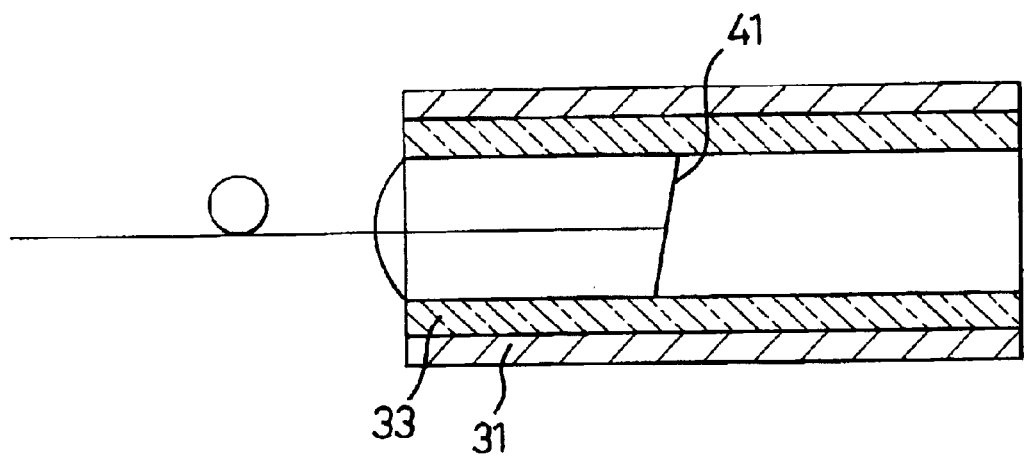
FIG. 4 is a cross-section of partial elements of a WDM unit showing step (d) of the method in accordance with the present invention.

With reference to FIG. 4, the step of securing a single fiber pigtail (41) inside the combination of the glass tube (33) and inner metal tube (31) is accomplished by inserting the single fiber pigtail (41) into the glass tube (33) mounted in the inner metal tube (31). In the embodiment, the glue (not shown) is spread on an outer sidewall of the single fiber pigtail (41) and/or inner sidewalls of the glass tubes (33). Next, the single fiber pigtail (41) is fixed in the combination of the glass tube (33) and the inner metal tube (31).

Figure 5:
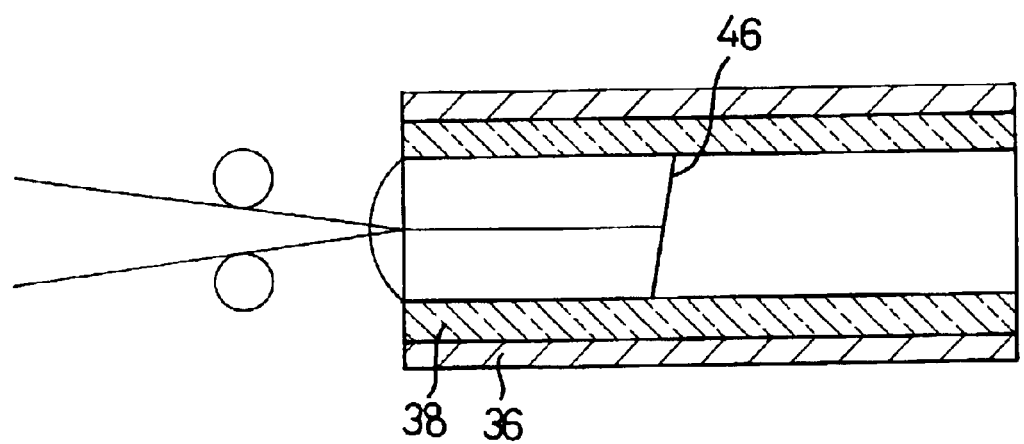
FIG. 5 is a cross-section of partial elements of a WDM unit showing step (d) of the method in accordance with the present invention.

With reference to FIG. 5, the step of securing a dual fiber pigtail (46) inside the combination of the glass tube (38) and inner metal tube (36) is accomplished by inserting the dual fiber pigtail (46) into the glass tube (38) mounted in the other inner metal tube (36). In the embodiment, the glue (not shown) is spread on an outer sidewall of the dual fiber pigtail (46) and/or the inner sidewall of the glass tubes (38). Next, the single fiber pigtail (41) is fixed in the combination of the glass tube (33) and inner metal tubes (31).

Figure 6:
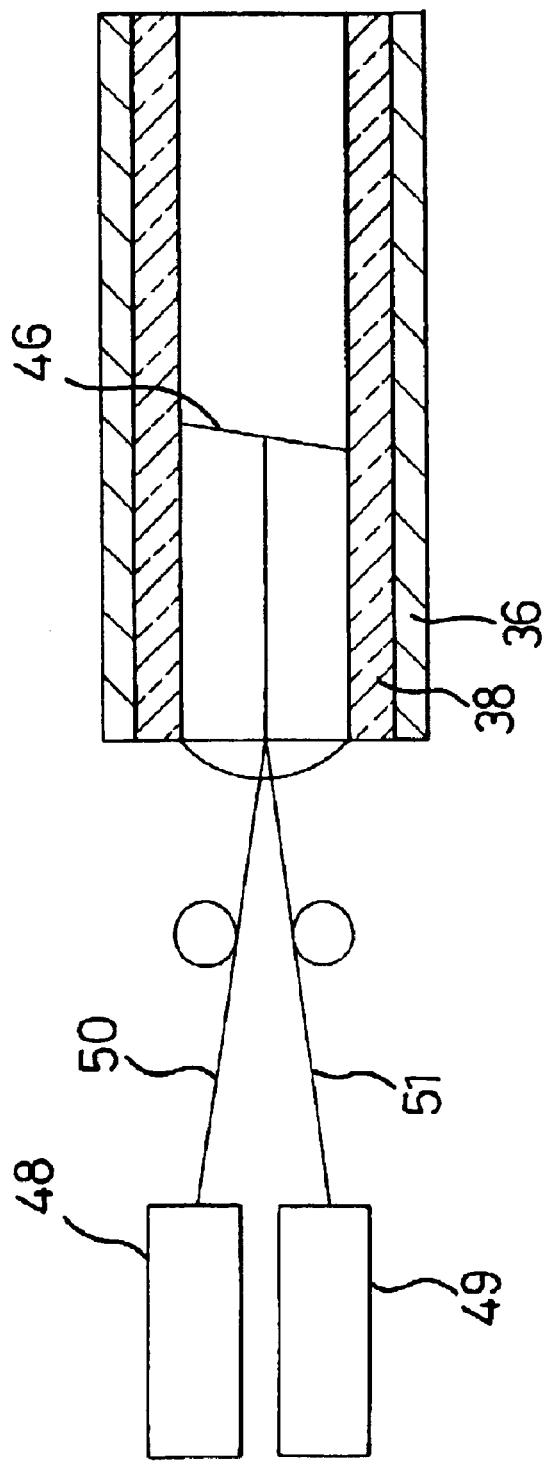
FIG. 6 is a cross-section of partial elements of a WDM unit showing schematically operational connection between the WDM unit and the testing instruments in step (e)

With reference to FIG. 6, the dual fiber pigtail (46) has a first optical fiber (50) and a second optical fiber (51). In the step of connecting test equipment, the first optical fiber (50) is connected to a testing light source (48), such as an amplified spontaneous emission (ASE) light source, and the second optical fiber (51) is connected to an efficiency measuring machine (49), such as a power-meter. The testing light source (48) provides light beams that meet specific standards, which pass through the WDM filter (11), and the efficiency measuring machine (49) detects the spectrum and strength of the light beams.

Figure 7:
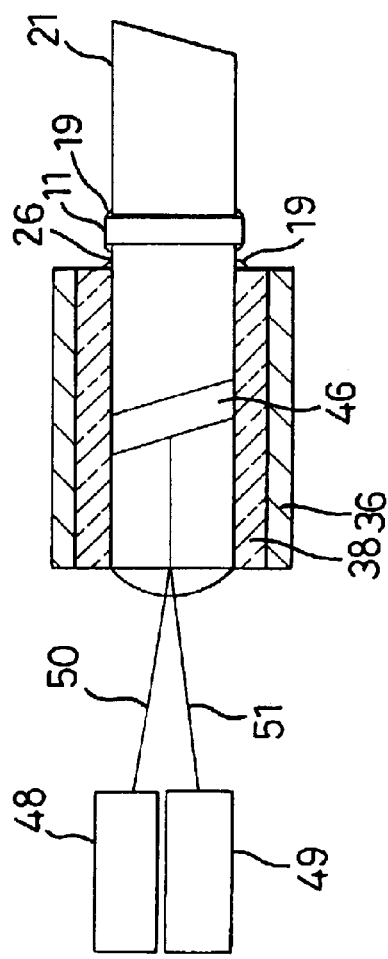
FIG. 7 is a cross-section of partial elements of a WDM unit showing step (f) of the method in accordance with the present invention.

With reference to FIG. 7, the step of adjusting the dual fiber pigtail (46) and positioning the dual fiber pigtail (46) to constitute a first optical collimator is accomplished using the following procedure. The second GRIN lens (26) is inserted into the glass tube (38) having the dual fiber pigtail (46). The testing light source (48) emits light beams traveling in the first optical fiber (50), and portion of the light beams reflected by the WDM filter (11) is transmitted in the second optical fiber (51) and received by the efficiency measuring machine (49). When the efficiency measuring machine (49) obtains the optimized result from the second optical fiber (51), the optimal position of the second GRIN lens (26) for the dual fiber pigtail is fixed by using the glue, wherein the glue is applied to the uncovered sidewall of the second GRIN lens (26) and the glass tube (38). Thus, a first optical collimator of the WDM unit is achieved.

Figure 8:
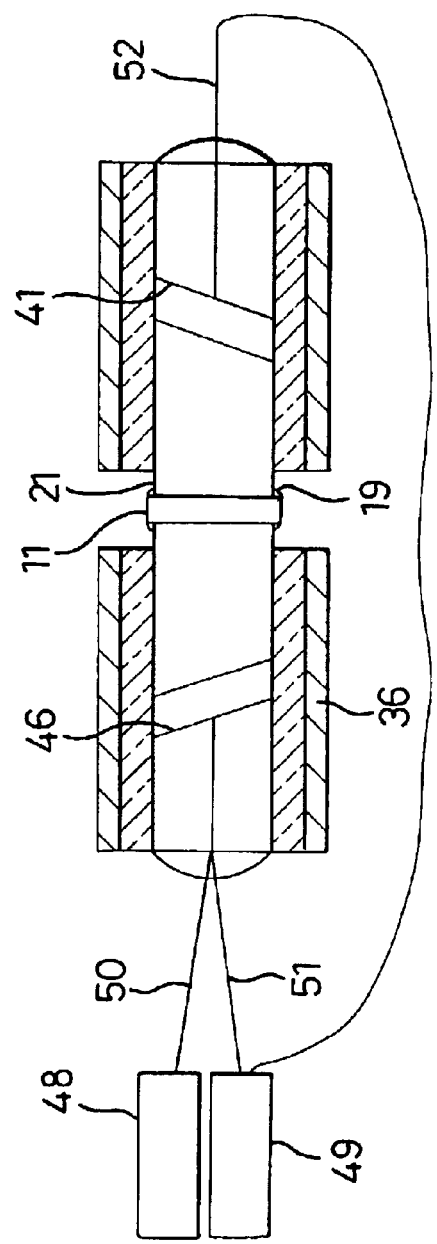
FIG. 8 is a cross-section of partial elements of a WDM unit showing step (g) of the method in accordance with the present invention.

With reference to FIG. 8, the step of adjusting the single fiber pigtail (41) to an optimal alignment with the first GRIN lens (21) and then positioning the single fiber pigtail (41) to form a second optical collimator is accomplished by using the following procedure. The first GRIN lens (21) is inserted into the glass tube (33) having the single fiber pigtail (41). The single fiber pigtail (41) is connected to the efficiency measuring machine (49) by a third optical fiber (52). The testing light source (48) emits a light beam traveling in the first optical fiber (50), and then the light beam is divided by the WDM filter (11). The light beam passing the WDM filter (11) enters the third optical fiber (52), and then is received by the efficiency measuring machine (49). When the efficiency measuring machine (49) obtains the optimized result from the third optical fiber (52), the optimal position of the first GRIN lens (21) for the single fiber pigtail is fixed by using the glue, wherein the glue is applied to the uncovered sidewall of the first GRIN lens (21) and the glass tube (33). Thus, a second optical collimator of the WDM unit is achieved.

Figure 9:
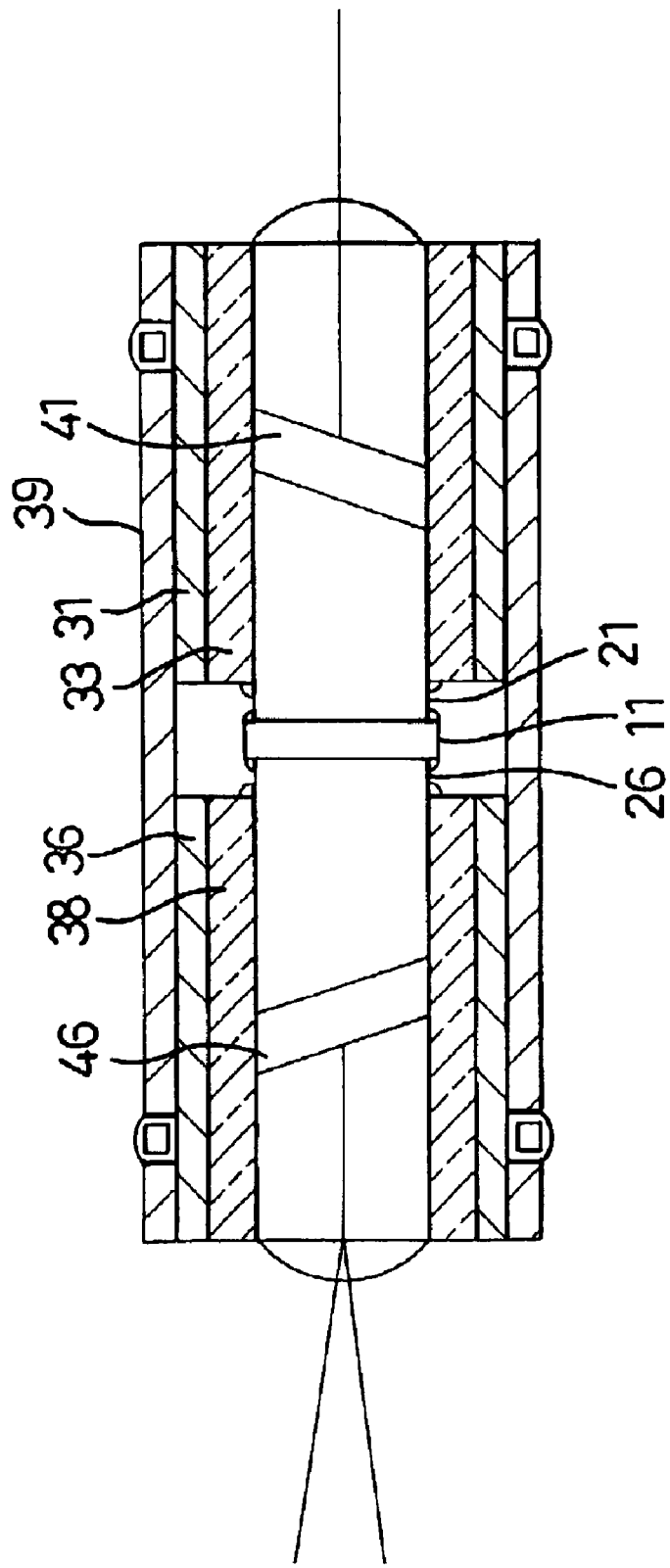
FIG. 9 is a cross-section of partial elements of a WDM unit showing step (h) of the method in accordance with the present invention.

With reference to FIG. 9, the step of securing the first and second optical collimators inside an outer metal tube (39) provides a rigid structure to the WDM unit. The outer metal tube (39) serves as an aligning means to enhance the rigidity of the WDM unit and prevent the WDM unit from deformation during temperature variation. The outer metal tube (39) is selectively attached to the two inner metal tubes (31, 36) by glue or tin welding. This step completes the method of fabricating the WDM unit.

In the invention, the glue (19) is either UV-curing epoxy or thermal-curing epoxy.

Figure 10:
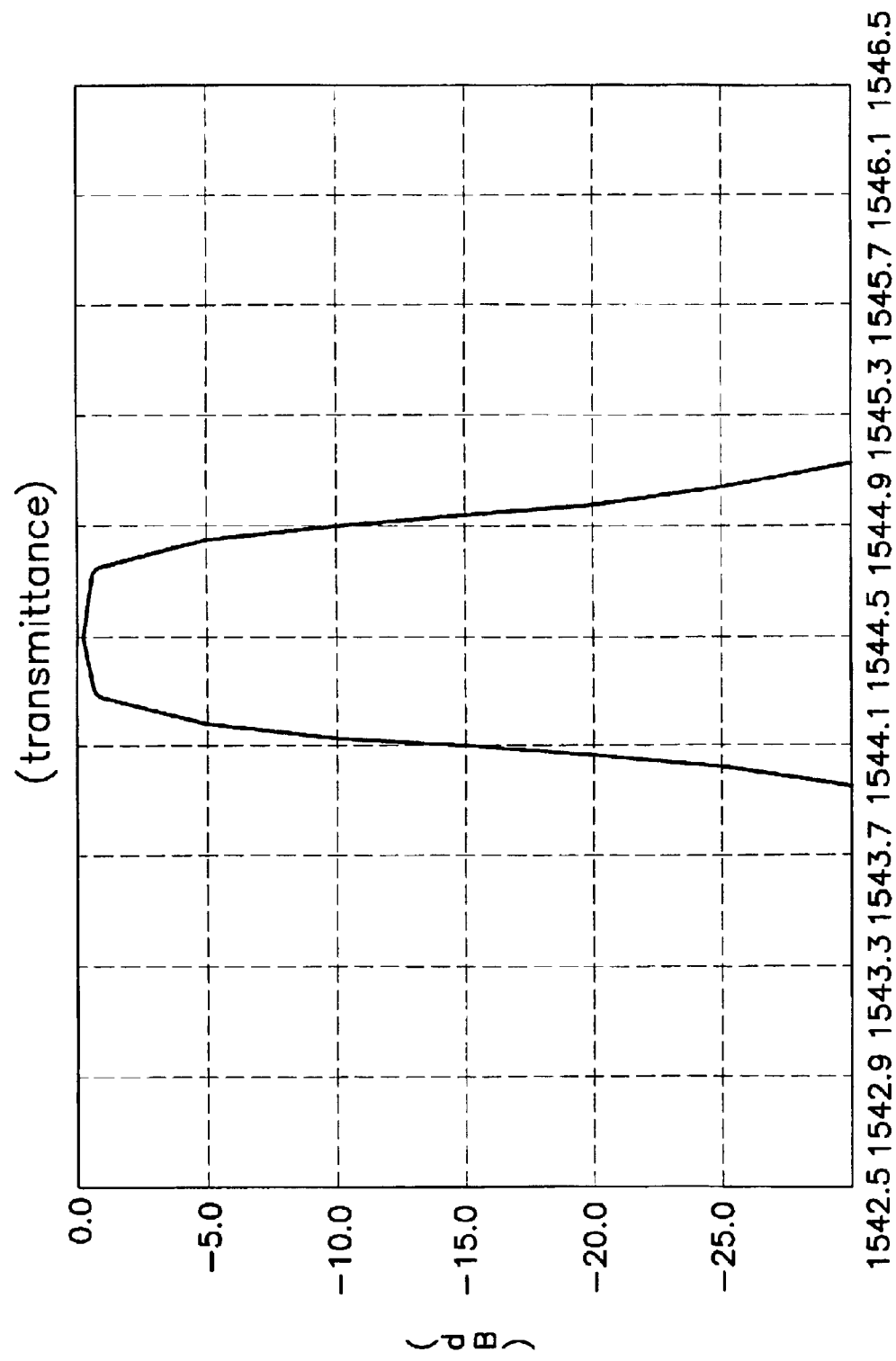
FIG. 10 is a testing diagram of insertion loss of the WDM unit made by the method of the present invention.
Figure 11:
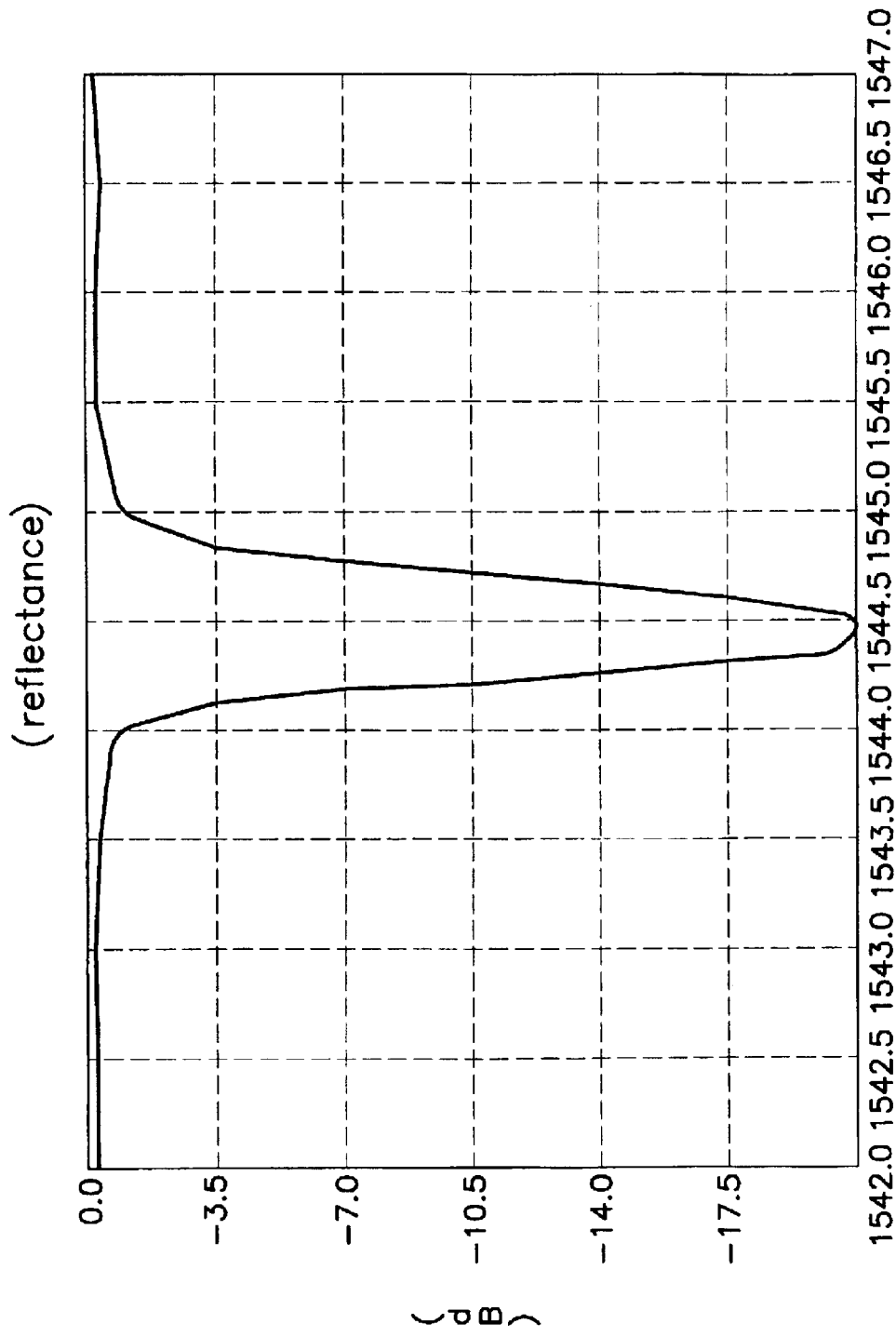
FIG. 11 is another testing diagram of reflection loss of the WDM unit made by the method of the present invention.
Figure 12:
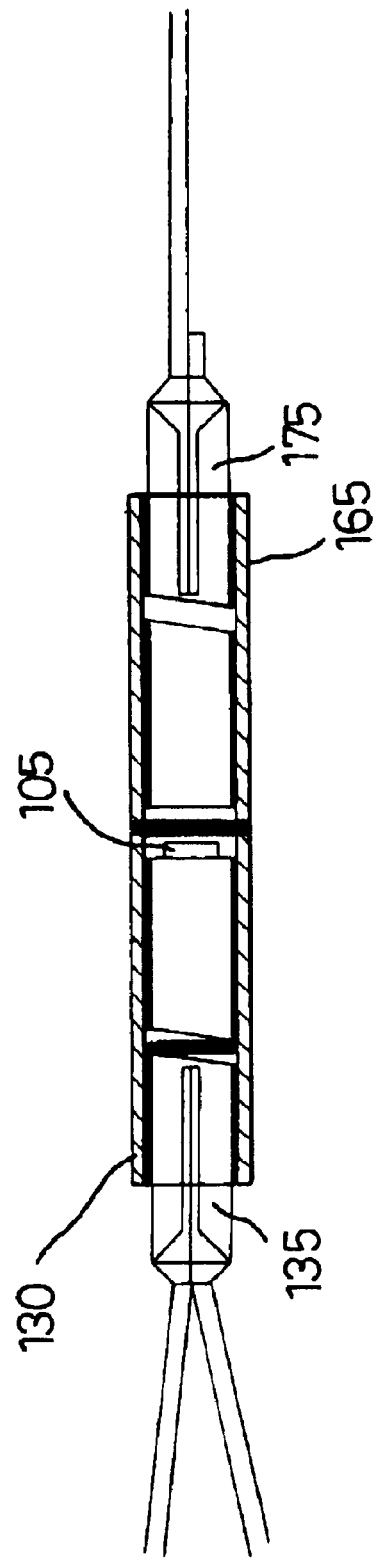
FIG. 12 is a cross-section of a conventional WDM unit.

In summary, the method consists of attaching the first and second GRIN lens (21, 26) to opposite faces of the WDM filter (11) first. Then, the dual fiber pigtail (46) is securely mounted in the combination of the glass tube (38) and the inner metal tube (36), and the single fiber pigtail (41) is securely mounted in another combination of the glass tube (33) and the inner metal tube (31). These assemblies are combined with the second GRIN lens (26) and the first GRIN lens (21) respectively. The positions of the assemblies relative to the second GRIN lens (26) and the first GRIN lens (21) are adjusted to minimize the reflection loss and insertion loss. The assemblies are glued in place on the second GRIN lens (26) and the first GRIN lens (21) respectively. FIGS. 10 and 11 respectively show the transmittance and reflectance of the WDM unit at 85° C. temperature, which is made by the method of this invention. As shown in FIGS. 10 and 11, the reflection loss and insertion loss are not increased.

Additionally, performance of steps (a) and (b) can be interchanged with steps (c) and (d), and the method will still produce the same WDM unit.

Finally, while the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of fabricating a WDM unit comprising the steps of:

attaching a first and second GRIN lenses to opposite surfaces of a WDM filter by glue, wherein the WDM filter has two flat faces and the first and second GRIN lenses both have a flat face adjacent to the two flat faces of the WDM filter, wherein the two flat faces of the WDM filter are larger than the corresponding flat faces on the first and second GRIN lenses so that the glue is applied to outer joint periphery of junctions between the WDM filter and the first and second GRIN lenses;

securing two glass tubes inside two inner metal tubes by glue respectively;

securing a dual fiber pigtail and a single fiber pigtail in the glass tubes by glue respectively;

positioning the second GRIN lens in one of the glass tube having the dual fiber pigtail, and adjusting the second GRIN lens to obtain an optimized result measured by a testing instrument;

securing the second GRIN lens in one of the glass tubes by glue;

positioning the first GRIN lens in another glass tube having the single fiber pigtail, and adjusting the first GRIN lens to obtain an optimized result measured by the testing instrument; and securing the first GRIN lens in the glass tube having the single fiber pigtail by glue.

2. The method of fabricating a WDM unit as claimed in claim 1, wherein the glue is thermal-curing epoxy.

3. The method of fabricating a WDM unit as claimed in claim 1, wherein the glue is UV-curing epoxy.

4. The method of fabricating a WDM unit as claimed in claim 1, further comprising the step of enclosing the WDM filter with an outer metal tube, wherein the two inner metal tubes are secured in the outer metal tube.

5. The method of fabricating a WDM unit as claimed in claim 4, wherein the glue is provided between an inner sidewall of the outer metal tube and an outer sidewall of the inner metal tube.

6. The method of fabricating a WDM unit as claimed in claim 4, wherein the outer metal tube is welded with the two inner metal tubes.

7. A WDM unit, which is fabricated according to claim 1, comprising:
a first optical collimator comprising:
a dual fiber pigtail having a first optical fiber and a second optical fiber;
a first GRIN lens aligning with the dual fiber pigtail;
a first glass tube for holding the first GRIN lens and the dual fiber pigtail; and
a first inner metal tube for grasping the first glass tube;
a second optical collimator comprising:
a single fiber pigtail having a third optical fiber;
a second GRIN lens aligning with the single fiber pigtail;
a second glass tube for holding the second GRIN lens and the single fiber pigtail; and
a second inner metal tube for grasping the second glass tube; and
a WDM filter sandwiched between the first and second optical collimators, wherein the first and second GRIN lenses are respectively attached to opposite surfaces of the WDM filter by glue;
wherein the WDM filter has two flat faces and the first and second GRIN lenses both have a flat face adjacent to the two flat faces of the WDM filter, wherein the two flat faces of the WDM filter are larger than the corresponding flat faces on the first and second GRIN lenses so that the glue is applied to outer joint periphery of the junctions between the WDM filter and the first and second GRIN lenses.

8. The WDM unit as claimed in claim 7, wherein the glue is thermal-curing epoxy.

9. The WDM unit as claimed in claim 7, wherein the glue is UV-curing epoxy.

10. The WDM unit as claimed in claim 7, further comprising an outer metal tube grasping the first and second inner metal tubes for enhancing the rigidity of the WDM unit and preventing the WDM unit from deformation during temperature variation.

11. The WDM unit as claimed in claim 10, wherein the glue is provided between the outer metal tube and the first inner metal and between the outer metal tube and the second inner metal tubes respectively.

12. The WDM unit as claimed in claim 10, wherein the outer metal tube is welded with the first and second inner metal tubes.

* * * * *